(12) United States Patent
Ishizaki et al.

(10) Patent No.: US 9,015,158 B2
(45) Date of Patent: Apr. 21, 2015

(54) CONTENTS CREATING DEVICE AND CONTENTS CREATING METHOD

(75) Inventors: Hiromi Ishizaki, Fujimino (JP);
Keiichiro Hoashi, Fujimino (JP);
Chihiro Ono, Fujimino (JP)

(73) Assignee: KDDI Corporation, Tokyo (JP)

( * ) Notice: Subject to any disclaimer, the term of this patent is extended or adjusted under 35 U.S.C. 154(b) by 0 days.

(21) Appl. No.: 13/221,644

(22) Filed: Aug. 30, 2011

(65) Prior Publication Data

US 2012/0072466 A1 Mar. 22, 2012

(30) Foreign Application Priority Data

Sep. 17, 2010 (JP) .................................. 2010-210189

(51) Int. Cl.
*G06F 7/00* (2006.01)
*G06F 17/30* (2006.01)
*G06Q 30/02* (2012.01)

(52) U.S. Cl.
CPC ...... *G06F 17/30705* (2013.01); *G06Q 30/0269* (2013.01)

(58) Field of Classification Search
USPC .................. 707/737, 738, 748, 749, 710, 752
See application file for complete search history.

(56) References Cited

U.S. PATENT DOCUMENTS

| | | | |
|---|---|---|---|
| 7,958,457 B1 * | 6/2011 | Brandenberg et al. | 715/789 |
| 2008/0294624 A1 * | 11/2008 | Kanigsberg et al. | 707/5 |
| 2009/0164897 A1 * | 6/2009 | Amer-Yahia et al. | 715/703 |
| 2009/0271413 A1 * | 10/2009 | Hoashi et al. | 707/10 |
| 2010/0046842 A1 * | 2/2010 | Conwell | 382/218 |
| 2011/0212717 A1 * | 9/2011 | Rhoads et al. | 455/420 |
| 2011/0264662 A1 | 10/2011 | Umezu | |
| 2011/0314084 A1 * | 12/2011 | Saretto et al. | 709/203 |
| 2012/0063367 A1 * | 3/2012 | Curtis et al. | 370/270 |

FOREIGN PATENT DOCUMENTS

| | | |
|---|---|---|
| JP | 2002-245123 A | 8/2002 |
| JP | 2007226345 A | 9/2007 |
| JP | 2008171085 A | 7/2008 |

(Continued)

OTHER PUBLICATIONS

Yoichi Yamashita, "Rumored iPad Application "Flipboard" Appeared, Set Twitter Stream etc. in Journal Form", [online], Mynavi Corporation, Jul. 22, 2010 URL, http://news.mynavi.

(Continued)

*Primary Examiner* — Hexing Liu
(74) *Attorney, Agent, or Firm* — Mitchell P. Brook; One LLP

(57) ABSTRACT

To provide a contents creating device and a contents creating method capable of distributing contents having an article arrangement with high relativity to a user as distribution destination. A contents creating device 100 to create contents to be distributed within a predetermined group, including a material evaluation unit 130 configured to evaluate relativity of material data of contents to a user as contents distribution destination, and a contents editing unit 140 configured to determine an article arrangement within contents according to an evaluation, wherein contents based on the article arrangement are created. Due to this, it is possible to distribute contents having an article arrangement with high relativity to a user of the distribution destination and it is possible for the user as distribution destination to browse an article in which the user is highly interested.

16 Claims, 12 Drawing Sheets

(56) References Cited

FOREIGN PATENT DOCUMENTS

| JP | 2010-165120 | * | 7/2010 | ............. | G06F 17/30 |
| JP | 2010-165120 A | | 7/2010 | | |
| JP | 2010181966 A | | 8/2010 | | |
| WO | WO 2010/076871 A1 | | 7/2010 | | |

OTHER PUBLICATIONS

Office Action dated Dec. 17, 2013 in Japanese Application No. 2010-210189 (English translation and original provided).
Office Action dated Mar. 25, 2014 in Japanese Application No. 2010-210189 (English translation and original provided).

* cited by examiner

| USER | GROUP TO WHICH USER BELONGS |
|---|---|
| USER a | GROUP G 1 |
| USER b | GROUP G 1 |
| . . . | . . . |

FIG. 6A

| USER | COMMUNITY SCORE | | | CATEGORY SCORE | | |
|---|---|---|---|---|---|---|
| USER a | USER b | USER c | . . . | RECENT STATE | W E B | . . . |
|  | 1 7 | 3 |  | 4 5 | 5 8 |  |
| USER b | USER a | USER c | . . . | RECENT STATE | W E B | . . . |
|  | 1 2 | 3 6 |  | 6 6 | 4 8 |  |
| . . . | . . . | | | . . . | | |

FIG. 6B

| ARTICLE | IMAGE SCORE | SENTENCE SCORE | CATEGORY SCORE | COMMUNITY SCORE | TOTAL SCORE |
|---|---|---|---|---|---|
| ARTICLE x 1 | 5 | 6 | 3 | 2 | 1 6 |
| . . . | . . . | . . . | . . . | . . . | . . . |

FIG. 6C

CONTENTS CREATING DEVICE AND CONTENTS CREATING METHOD

BACKGROUND OF THE INVENTION

1. Field of the Invention

The present invention relates to a contents creating device and a contents creating method to create contents to be distributed within a predetermined group.

2. Description of the Related Art

Conventionally, as media on the Internet, there are many business models in which contents are created by professional writers and editors, however, recently, media called CGM appear, in which a general consumer directly contributes information and it is published. In the CGM, it is general that real experiences and live voices are provided/accumulated in real time and the CGM is shared/browsed on the WEB within a community of information collection or acquaintances/friends etc. A technique to create contents as an information portal in which an individual can easily collect necessary information is being researched and developed.

On the other hand, a technique to display electronic information, such as newspapers and magazines, in an easily readable manner is being developed. For example, according to an electronic information display device described in Japanese Patent Laid-Open No. 2010-165120, when displaying electronic information, such as newspapers and magazines, its area and arrangement are determined according to the degree of importance of the article and in the region, the headline of the article and a part of the full text of the article are displayed readably. Further, a technique to automatically determine the degree of importance of a newspaper article is also being developed. In the creation system of a page of newspapers described in Japanese Patent Laid-Open No. 2002-245123, the degree of importance is determined according to a basis for evaluation determined in advance for each element to be published on each page of newspapers.

As described above, there exists a technique to create contents as a private information portal, however, a system in which these contents are selected according to the state of a browser to integrate the contents effectively has not been developed sufficiently. The techniques to arrange articles as described in Japanese Patent Laid-Open No. 2010-165120 and Japanese Patent Laid-Open No. 2002-245123 are used to turn the pages of newspapers into electronic media and are only utilized commercially.

BRIEF SUMMARY OF THE INVENTION

The present invention has been made in view of such circumstances and an object thereof is to provide a contents creating device and a contents creating method capable of distributing contents having an article arrangement with high relativity to a user as distribution destination.

(1) In order to achieve the above-mentioned object, a contents creating device of the present invention is a contents creating device to create contents to be distributed within a predetermined group, characterized by comprising a material evaluation unit configured to evaluate relativity of material data of contents article to a user as contents distribution destination and a contents editing unit configured to determine an article arrangement within the contents according to the evaluation, and in that contents based on the article arrangement are created.

As described above, the contents creating device of the present invention evaluates relativity of material data of contents to a user as contents distribution destination and determines an article arrangement. Due to this, it is possible to distribute contents having an article arrangement with high relativity to a user as distribution destination. As a result of that, it is possible for a user as distribution destination to browse an article in which the user is highly interested.

(2) A contents creating device of the present invention is characterized in that the material evaluation unit makes use of a basis for evaluation held by each user as the contents distribution destination and updated according to browsing of an article to evaluate relativity each time.

Due to this, it is possible to distribute contents having an article arrangement with high relativity to a user while updating the basis for evaluation. For example, while causing a browsing result of an article to be fed back into a predetermined parameter, it is possible to determine an article arrangement using the parameter.

(3) A contents creating device of the present invention is characterized in that the material evaluation unit evaluates the relativity using a relationship between a user as the contents distribution destination and a user as a supply source of the material data as a basis for evaluation.

Due to this, it is possible to reflect the relationship between users in the article arrangement and to distribute contents suitable for the user as distribution destination. For example, in the contents to be distributed, it is possible to arrange an article in which a user is interested at an upper part or to arrange an article not read by a user for a fixed period of time at an upper part to attract attention of the user.

(4) A contents creating device of the present invention is characterized in that the material evaluation unit evaluates the relativity using a relationship between a category to which the material data belongs and a user as the contents distribution destination as a basis for evaluation. Due to this, it is possible to reflect the relationship between the user as distribution destination and the category in the article arrangement. For example, it is possible to arrange an article in the category in which the user is interested at an upper part.

(5) A contents creating device of the present invention is characterized in that the material evaluation unit evaluates the relativity using a relationship between a feature amount of the material data and a user as the contents distribution destination as a basis for evaluation. Due to this, it is possible to determine an article arrangement on the basis of the relationship between the feature of the material data and the user as distribution destination. For example, when the user as distribution destination is interested in outdoor leisure and image data of a sea is the material data, it is possible to arrange the article based on the image data at an upper part.

(6) A contents creating device of the present invention is characterized in that the contents editing unit evaluates the total relativity as a vector by weighting the relativities, respectively, to extract the material data. Due to this, it is also made possible to evaluate high the relativity that plays an important role for a user as distribution destination and to evaluate the relativity to the user as distribution destination in detail.

(7) A contents creating device of the present invention is characterized in that the contents editing unit evaluates the relativity by weighting it according to the state of a user as distribution destination to extract the material data. Due to this, it is made possible to enable evaluation in view of the location or time band where the user as distribution destination is present and to create contents in which different articles are arranged according to the state of the user.

(8) A contents creating device of the present invention is characterized by comprising a reaction management unit configured to receive a reaction to the material data from a user within the predetermined group and an interview execution unit configured to notify a user as a supply source of the material data of the reaction and to receive a reply from the user as the supply source, and in that contents are created by making use of the material data including the reply. Due to this, it is possible to easily create an article from the material data and to create contents suitable for each user.

(9) A contents creating device of the present invention is characterized in that the reaction management unit receives a specification of an article within the created contents by a user as distribution destination and contents for the user as distribution destination are created newly using the specified article received by the reaction management unit. Due to this, by the user as distribution destination selecting favorite articles, it is possible to create contents in which the entire page (scrap book page) is filled with the favorite articles. The contents may be those part of which includes articles specified by the user as distribution destination or those the whole of which includes articles specified by the user as distribution destination (scrap book contents).

(10) A contents creating method of the present invention is a contents creating method to create contents to be distributed within a predetermined group, characterized by comprising the steps of evaluating relativity of material data of contents article to a user as contents distribution destination to determine an article arrangement within the contents according to the evaluation and distributing contents based on the article arrangement. Due to this, it is possible to distribute contents having an article arrangement with high relativity to the user as distribution destination. As a result of that, it is possible for the user as distribution destination to browse an article in which the user is highly interested.

According to the present invention, it is possible to distribute contents having an article arrangement with high relativity to a user as distribution destination.

BRIEF DESCRIPTION OF THE SEVERAL VIEWS OF THE DRAWINGS

FIGS. 6(a) to 6(c) are tables each showing a correspondence relationship of each piece of data.

DETAILED DESCRIPTION OF THE INVENTION

Figure 1:
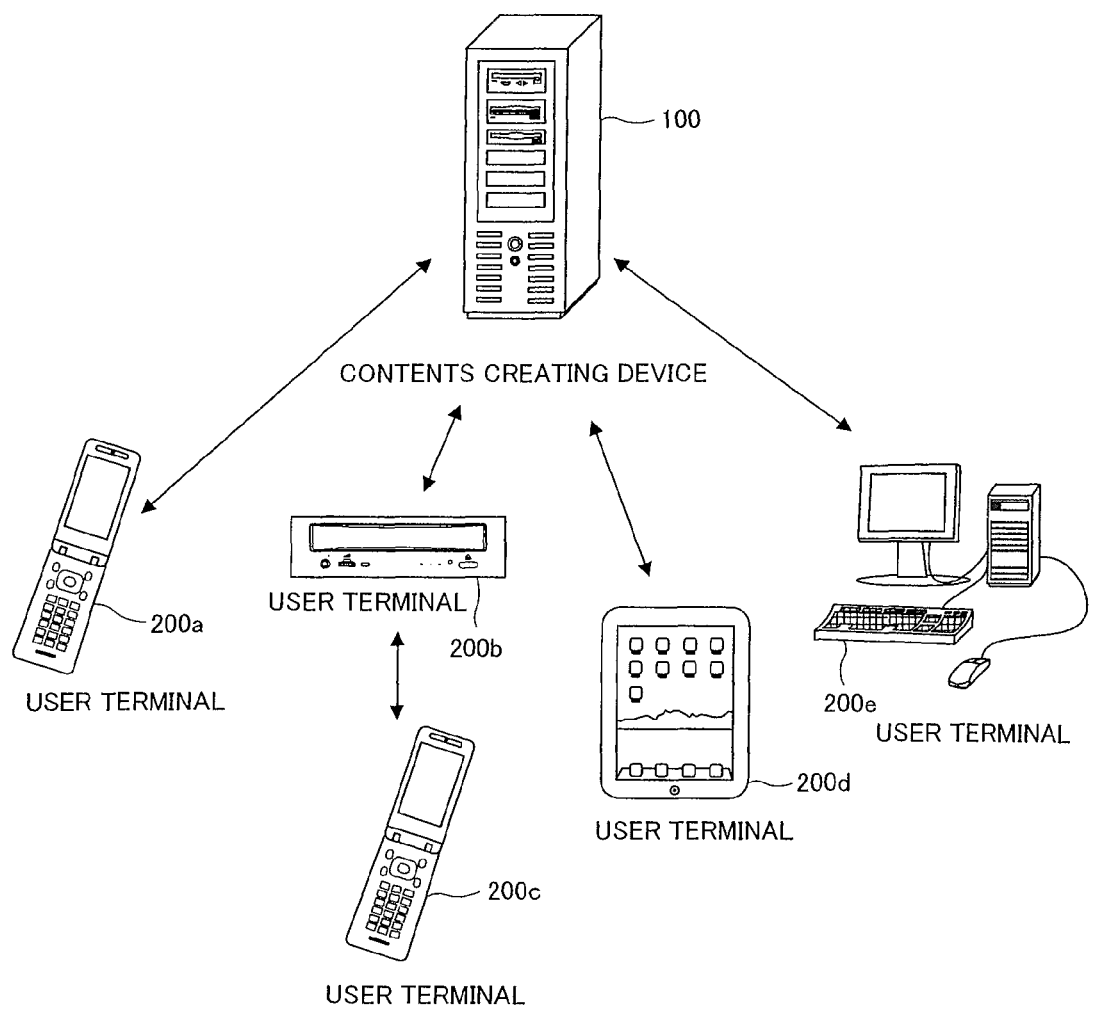
FIG. 1 is an outline diagram showing a general configuration of a contents distribution system according to a first embodiment.

Embodiments of the present invention are described below with reference to the drawings. In order to make it easier to understand the explanation, the same reference numeral is attached to the same component in each drawing and duplicated explanation is omitted.

First Embodiment

Configuration of General System

FIG. 1 is an outline diagram showing an example of a general configuration of a contents distribution system. As shown in FIG. 1, a contents distribution system includes a contents creating device 100 and user terminals 200a to 200e. The contents creating device 100 is connected with the user terminals 200a to 200e via the Internet and creates contents to be distributed within a predetermined group. The user terminals 200a to 200e are terminal devices that can be connected to the contents creating device 100 via the Internet. The user terminal can be, for example, of a mobile telephone, tablet terminal, PC, STB, etc., and its kind is not limited in particular. Further, it may also be possible to perform transmission/reception of information between the user terminal 200b (STB) and the user terminal 200c (mobile telephone).

Configuration of Contents Creating Device

Figure 2:
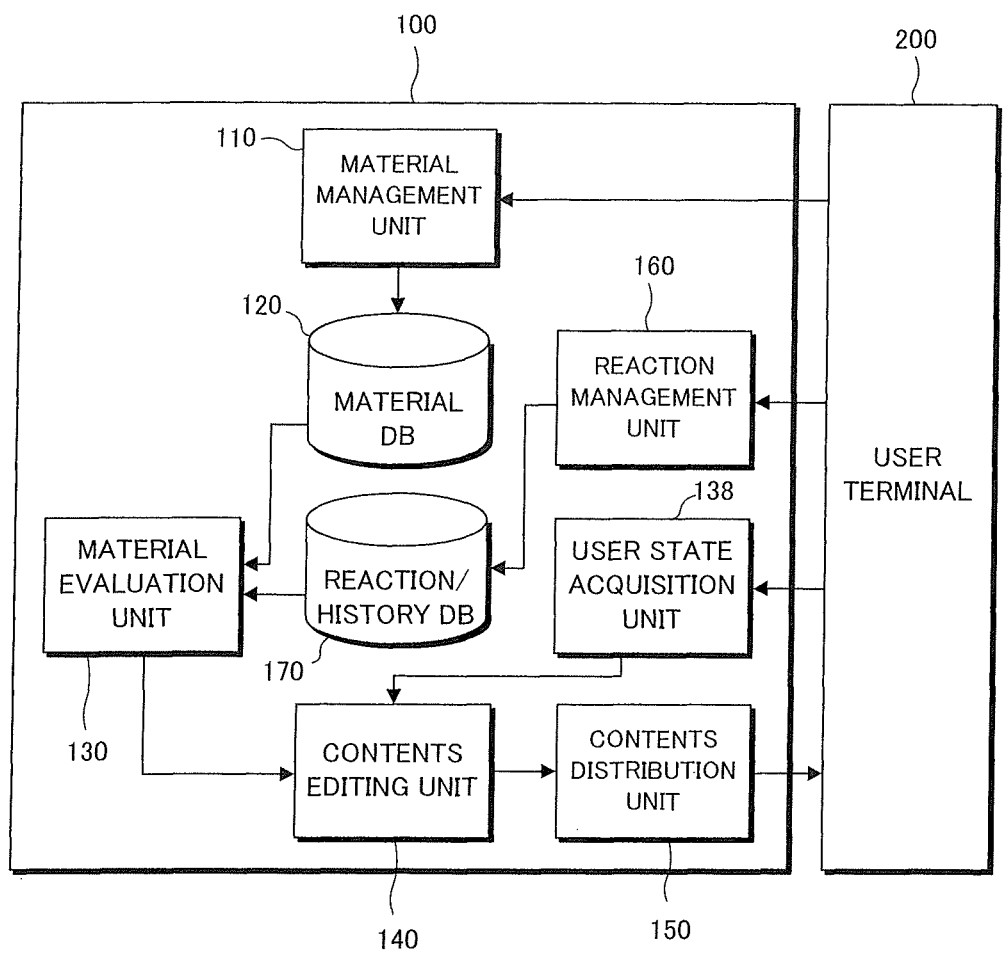
FIG. 2 is a block diagram showing a configuration example of a contents distribution system according to the first embodiment.
Figure 3:
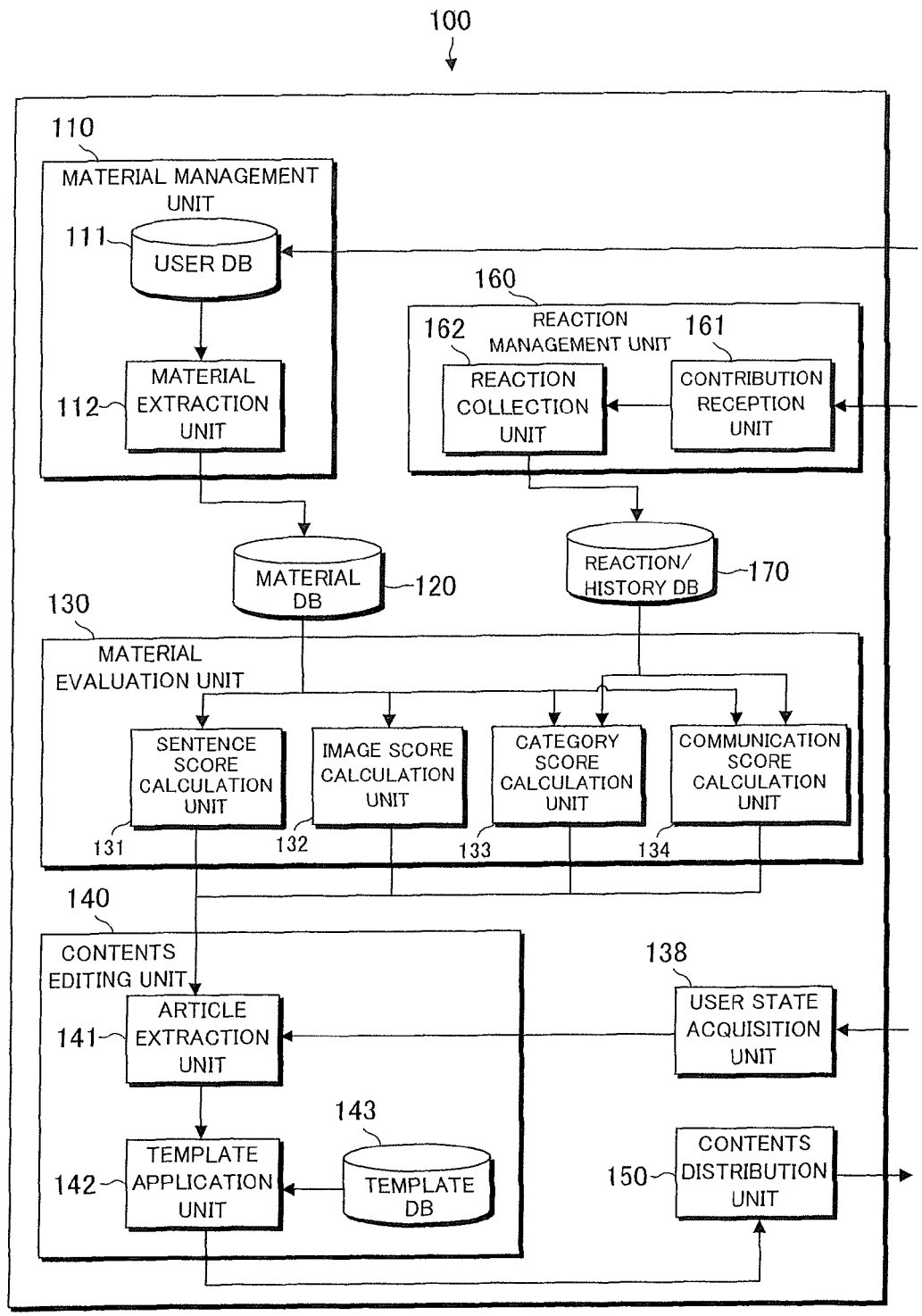
FIG. 3 is a block diagram showing a detailed configuration of a contents creating device according to the first embodiment.

FIG. 2 is a block diagram showing a configuration example of a contents distribution system. As an example, a system comprising a user terminal 200 (corresponding to the above-mentioned user terminals 200a to 200e), which is a supply source or a distribution destination of material data of an article, is explained. FIG. 3 is a block diagram showing a detailed configuration of the contents creating device 100.

As shown in FIG. 2 and FIG. 3, the contents creating device 100 includes a material management unit 110, a material database 120, a material evaluation unit 130, a user state acquisition unit 138, a contents editing unit 140, a contents distribution unit 150, a reaction management unit 160, and a reaction/history database 170.

The material management unit 110 stores material data supplied by the user terminal 200, which is a material supply source, in the material database 120 for management. Material data includes, for example, text data, image data, voice data, etc. The material management unit 110 includes a user database 111 and a material extraction unit 112.

The user database 111 stores user account names and account images of the followers and destinations to follow of the user acquired based on the user account input to the user terminal 200 in an instant message exchange system represented by Twitter (registered trademark). The follower refers to a person who has registered so as to be capable of selectively browsing a contribution of the user and the destination to follow refers to a contributor of a contribution registered so as to be capable of selectively being browsed. In this manner, in the user database 111, user accounts, passwords, thumbnails input through the user terminal are stored. Further, the user database 111 stores user accounts within a community in an instant message exchange system.

The material extraction unit 112 collects information from which as an article material is created by making use of a user account and stores the information in each database. Information targeted by the material extraction unit 112 is classified into categories set in advance. For example, the following categories are supposed.

(1) Information about User's Recent State

Already created blogs and diaries, and recent state information created by a community in an instant message exchange system are acquired and information stored in the database can be targeted.

(2) User's Community Information

The community information in an instant message exchange system stored in the user database 111 can be targeted. That is, it is possible to make use of information stored in the database by acquiring meta information, such as a timeline of a user and date of contribution, based on the community information. In order to acquire information, API can be used.

(3) Newly-Arrived News Article

Newly-arrived current affairs news acquired by making use of RSS and API can be targeted. As the material extraction unit 112, it may also be possible to make use of RSS and API made capable of being set manually.

The material extraction unit 112 determines the existence/nonexistence of a link from the contents of the acquired timeline information. Information about link destination is acquired for an instant message determined to have a link. When acquired information is a photo, a label indicative of the existence of an image is attached and when there is no image at the link destination, a label indicative of the nonexistence of an image is attached. Details of such material data extraction process are described below. It may also be possible to make it possible for the material extraction unit 112 to apply filtering according to the number of instant messages or time when determining the contents of the link.

The material database 120 stores material data supplied by a user. The material database 120 attaches an article material ID, acquisition date/time for each piece of information acquired as described above. At this time, it is possible to store contents after separating the contents into sentences and images. Further, the material database 120 stores article materials acquired by the material extraction unit 112, such as recent state information, community information of instant message services, and newly-arrived news. It is possible to store the creation date of the article, the account, URL information of the supply source etc., along with main information in the database.

The material evaluation unit 130 evaluates relativity of material data of contents to the user as contents distribution destination by the degree of importance. Then, the material evaluation unit 130 determines an arrangement of articles obtained from material data within the contents according to the evaluation. Due to this, it is possible to distribute contents having an article arrangement with high relativity to the user as distribution destination. As a result of that, it is possible for the user as distribution destination to browse an article which is highly interesting for the user.

It is also possible for the material evaluation unit 130 to make use of a basis for evaluation held by each user as the contents distribution destination and updated according to the browsing of the article in the evaluation of relativity each time. That is, it is possible to enable evaluation by feedback. Due to this, it is possible to distribute contents having an article arrangement with high relativity to a user while updating the basis for evaluation. For example, while feeding back the result of browsing of the article into a predetermined parameter, it is possible to determine an article arrangement using the parameter.

The material evaluation unit 130 includes a sentence score calculation unit 131, an image score calculation unit 132, a category score calculation unit 133, and a communication score calculation unit 134. The calculation of each score is explained below.

<Sentence Score>

The sentence score calculation unit 131 extracts a sentence of an article material stored in the article material database and calculates a sentence score based on the amount of sentence and the amount of information. The amount of sentence is calculated by the number of characters and the number of unique words included in the sentence is used for the amount of information. These parameters or parameters based on these parameters are held as a sentence score.

<Image Score>

The image score calculation unit 132 extracts an image of material data stored in the material database 120 and calculates an image score based on the image feature amount extracted from the image. The image feature amount includes, for example, BoVW (Bag-of-Visual-Words), color moment, edge direction histogram, and LBP (Local binary pattern).

BoVW (Bag-of-Visual-Words) is a feature amount based on a SIFT feature amount extracted from an image. The SIFT feature amount is a feature amount that represents a local pattern on the periphery of a certain feature point by a 128-dimensional feature vector. The color moment is a feature amount represented by the average, standard deviation, and skewness of color information in the LUV color space.

The edge direction histogram is a feature amount that represents a distribution in the edge direction of an image by making use of cannyfilter. LBP (Local binary pattern) is a feature amount that represents information about the shape of an edge within an image using the Gabor wavelet feature. As a method of representing information about a shape, it resembles the SIFT feature amount, however, the extraction system is different.

Such image feature amounts as described above are used as a histogram. The image score is calculated by calculating the similarity with the average image feature amount found from large-capacity image data extracted by an image retrieval API, such as Flicker (registered trademark). It is possible to use cosine similarity in calculation of similarity.

If it is assumed that the average image feature amount is Vaverage=x1, . . . , xQ and the input image feature Vinput=y1, . . . , yQ, the cosine similarity Sim (Vaverage, Vinput) between Vaverage and Vinput can be expressed as follows.

$$Sim(V_{average}, V_{input}) = \frac{\sum_{i=1}^{Q} x_i y_i}{\sqrt{\sum_{i=1}^{Q} x_i^2} \sqrt{\sum_{i=1}^{Q} y_i^2}} \quad (1)$$

As described above, it is possible for the material evaluation unit 130 to evaluate relativity using the relationship between the feature amount of material data and the user as contents distribution destination as a basis for evaluation. For example, when the user as distribution destination is interested in outdoor leisure and the image data including data of a sea is the material data, it is possible to highly evaluate the degree of importance of the article based on the image data.

<Category Score Calculation Unit>

The category score calculation unit 133 calculates a category score for material data z based on the reaction information to the category of a user. It is possible for the category score calculation unit to make use of category information of, for example, a recent state information category, Tweet image existent category, Tweet image nonexistent category, newly-arrived news article category.

It is possible for the category score calculation unit 133 to make use of two systems of calculating a category score, that is, the following reaction promotion system and reaction maintenance system. First, category information is represented as Cg={cg1, cg2, cg3, cg4} and reaction values to the category stored in the reaction/history database are represented as Rcg={rcg1, rcg2, rcg3, rcg4}. In the reaction maintenance system, a category score Pzy of a category y to which the article z belongs can be calculated by the following formula.

$$P_{zy} = \frac{rcg_y}{\sum Rcg} \quad (2)$$

Next, in the reaction promotion system, the reaction values are ranked. If the rank of a reaction value of a certain category y is assumed to be ranky and a numerical value, which is provided by adding 1 and the number of categories, is L, the category parameter Pzy can be calculated by the following formula.

$$P_{zy} = \frac{rcg_{L-ranky}}{\sum Rcg} \quad (3)$$

In the formula (3), rcgL-ranky represents that uses the reaction value of the category holding the minimum value are used for a category holding the maximum value of the reaction value of the category.

In this manner, the material evaluation unit 130 evaluates relativity using the relationship between the category to which the material data belongs and the user as contents distribution destination as a basis for evaluation. Due to this, it is possible to perform ranking and to reflect the relationship between the user as distribution destination and the category in the article arrangement. For example, it is possible to arrange an article belonging to a category in which a user is interested at an upper part. Specifically, it is possible to reflect to which article belonging to which category is requested or questioned, or which article belonging to which category is browsed.

<Communication Score Calculation Unit>

The communication score calculation unit 134 calculates a communication score for an article of a user as a supply source based on the amount of communication between the user as the supply source and a browser. First, an amount of communication is measured within an instant message exchange system based on a reply message (for example, ReTweet and Reply) in the community in the instant message exchange system represented by Twitter (registered trademark). If it is assumed that users within the community in the instant message exchange system are represented as Uf={u1, . . . , uN} and initial amounts of communication as Cf={c1, . . . , cN} (N is the number of users within the community in the instant message exchange system), then an amount of communication cnx is attenuated according to the following forgetting function with respect to days T.

$$cn_x = c_x \times \lambda T \quad (4)$$

Here, λ is an attenuation coefficient and can be set arbitrarily in the range of 0<λ<1. When a communication occurs, it is reset by the amount of communication cnx in the following mathematical formula.

$$c_{nx} = c_x \quad (5)$$

Further, at this time, a communication occurrence frequency Fc is summed for each user. Specifically, the following formula is used for management.

$$F_c = \{fc_{u1}, \ldots, fc_{u_N}\} \quad (6)$$

When the communication occurrence frequency exceeds a certain threshold value TH, the communication score calculation unit 134 adds an arbitrary numerical value to the initial amount of communication. Further, it may also be possible to display the number of times of communication occurrence or the amount of communication to analyze the tendency of reaction of a user.

By making use of the above-mentioned amount of communication, the communication score of the article supplied by the user is calculated. For the calculation of the communication score, the following two kinds of scoring system, that is, a communication activation system and a communication maintenance system can be used.

The communication activation system is a system in which the recent state information of a user as supply source having a small amount of communication with the user as distribution destination is output with priority. The communication maintenance system is a system in which the recent state information of a user having a large amount of communication is output with priority. It is possible for the communication score calculation unit 134 to switch between, for example, the above-mentioned two systems manually. Details of each system are explained below.

It is assumed that an amount of communication with a certain user x is cnx and a reaction value to x is rx. Scores Sc in the above-mentioned two systems when the recent state information z originating from the certain user x is given are represented as follows, respectively. When the communication activation system is adopted, it is possible to calculate the score by, for example, the following mathematical formula (7).

$$Sc(z) = \frac{(r_x + 1)}{cn_x} \quad (7)$$

When the communication maintenance system is adopted, it is possible to calculate the score by, for example, the following mathematical formula (8).

$$Sc(z) = cn_x \times (r_x + 1) \quad (8)$$

If the above-mentioned scores have the same value, it is possible to make use of recent state information as of the most recent date.

As described above, the material evaluation unit 130 evaluates relativity using the relationship between the user as contents distribution destination and the user as supply source of material data as a basis for evaluation. Due to this, it is possible to reflect the relationship between users in the article arrangement and to distribute contents suitable for the user as distribution destination. For example, it is possible to arrange an article in which the user is interested at an upper part or to arrange an article at an upper part to attract attention of the user who has not read the article for a certain period of time in the contents to be distributed. The material data obtained in this manner may be used as an article as it is or may be adjusted appropriately so that it can be published as an article. In this manner, it is possible to reflect which user's article is browsed in the relativity (degree of importance) and to reflect which user is reacted (requested or questioned) in the relativity.

The user state acquisition unit 138 extracts the state of the user from the display device. For example, as information about the user state, GPS information (positional information), time information are extracted. By making use of GPS information, whether the user is at home or out is determined from the registered address of the user and the determination result is transmitted to an article extraction unit 141 along with time information.

The contents editing unit 140 includes the article extraction unit 141, a template application unit 142, and a template database 143. The contents editing unit 140 extracts material data from which an article is created according to the evaluation and determines the article arrangement within the contents. The contents editing unit 140 evaluates the total relativity as a vector by weighting the relativities, respectively, and extracts material data, as explained below with a specific example. Due to this, it is also made possible to highly evaluate the relativity that play an important role for the user as distribution destination and to evaluate the relativity to the user as distribution destination in detail. At that time, it is preferable to evaluate the total relativity as a vector of degree of importance by weighting a plurality of relativities according to the state of the user as distribution destination. Due to this, evaluation in view of the place or time band in which the user as distribution destination is present is enabled and it is possible to create contents in which different articles are arranged according to the state of the user.

The article extraction unit 141 grasps each score obtained by the sentence score calculation unit 131, the image score calculation unit 132, the category score calculation unit 133, and the communication score calculation unit 134 as information of a histogram. Then, this is used as a vector of degree of importance for an article and an article with a high degree of importance is extracted as an article to be published. For example, a vector of degree of importance Im$_z$ for a certain article z can be represented as follows using weight coefficients α1 to α4.

$$\text{Im}_z = \{\alpha_1 T_z, \alpha_2 \text{Sim}(V_{average}, V_z), \alpha_3 P_z, \alpha_4 Sc(z)\} \quad (9)$$

The article extraction unit 141 weights each component of a vector of degree of importance based on information obtained by the user state acquisition unit 138. Examples of state classification and weighting parameters in the classification are described below.

Place:home, Time:morning, α1=0.5:α2=0.5:α3=1.0:α4=0.5
Place:home, Time:noon, α1=0.5:α2=0.5:α3=0.5:α4=1.0
Place:home, Time:night α1=0.5:α2=0.5:α3=1.0:α4=1.0
Place:out, Time:morning, α1=1.0:α2=1.0:α3=0.5:α4=0.5
Place:out, Time:noon, α1=1.0:α2=1.0:α3=1.0:α4=0.5
Place:out, Time:night, α1=1.0:α2=1.0:α3=0.5:α4=1.0

In the examples described above, in the state where the user is at home in the morning, the vector of degree of importance Im$_z$ is calculated with the weights α1=0.5, α2=0.5, α3=1.0, α4=0.5. Then, finally, according to the magnitude of the vector of degree of importance Im$_z$, articles are ranked. Weighting parameters can be set arbitrarily.

The template application unit 142 lays out articles extracted by the article extraction unit 141 for the template of newspaper or magazine prepared in advance. In the template database 143, layout templates in the form of newspaper and magazine prepared in advance are stored. It may also be possible to lay out articles not applied to the newspaper layout to the magazine layout. Details of article arrangement are described below.

The contents distribution unit 150 distributes integrated contents to which a template is applied based on the article arrangement. The contents distributed in this manner are displayed on the user terminal 200b. The user terminal 200b may be a display device, such as a tablet terminal on which a touch panel is mounted. In such a case, it is possible to include a GUI with which details of an article can be browsed by touching the article. Then, whether or not the article is browsed can be checked by whether or not touched. When a touch panel is not used, it is possible to check whether or not browsed by clicking or pressing of a button to read details of the article.

The reaction management unit 160 receives a reaction (request or question) to the material data from a user within a predetermined group or a reaction to the contents article. The reaction management unit 160 includes a contribution reception unit 161 and a reaction collection unit 162. The contribution reception unit 161 receives a contribution to an instant message exchange system represented by Twitter (registered trademark) on the GUI of the user terminal 200b. The user terminal 200 has a function to enable contribution by making use of an instant message exchange system API when the contribution button is pressed down. It may also be possible to include a reply function (for example, Retweet) in addition to contribution to an article. The reaction collection unit 162 collects articles displayed on the GUI, articles for which the "VOTE IT UP!" button is pressed down, and account information of the supply source and stores them in the reaction/history database 170.

The reaction management unit 160 receives specification made by a distribution destination user for an article within the created contents. Then, it is possible for the contents creating device 100 to create and distribute new contents for the user as distribution destination based on the received article specification. Due to this, it is possible to create contents in which a page is filled with all the favorite articles of the user as distribution destination. Alternatively, it may also be possible to create contents including all the favorite articles of the user as distribution destination.

The reaction/history database 170 stores reaction information, browse (touch) history, etc., obtained by the contents distribution unit 150 and the contribution reception unit 161. It is preferable to store the reaction/browse history by associating the account and URL information of the supply source therewith. Further, it is possible for the reaction/history database 170 to store the reaction value for each category as well as to manage the reaction value for each user.

The reaction value for each user can be expressed by the following formula.

$$R_{user} = \{r_{u1}, r_{u2}, \ldots, r_{uN}\} \quad (10)$$

The reaction value for each category can be expressed by the following formula.

$$Rcg = \{rcg_1, rcg_2, rcg_3, rcg_4\} \quad (11)$$

The contents creating device 100 includes the user database 111, the material database 120, the template database 143, and the reaction/history database 170 as databases. Each database can be constructed by using MySQL.

Operation of Contents Creating Device

Figure 4:
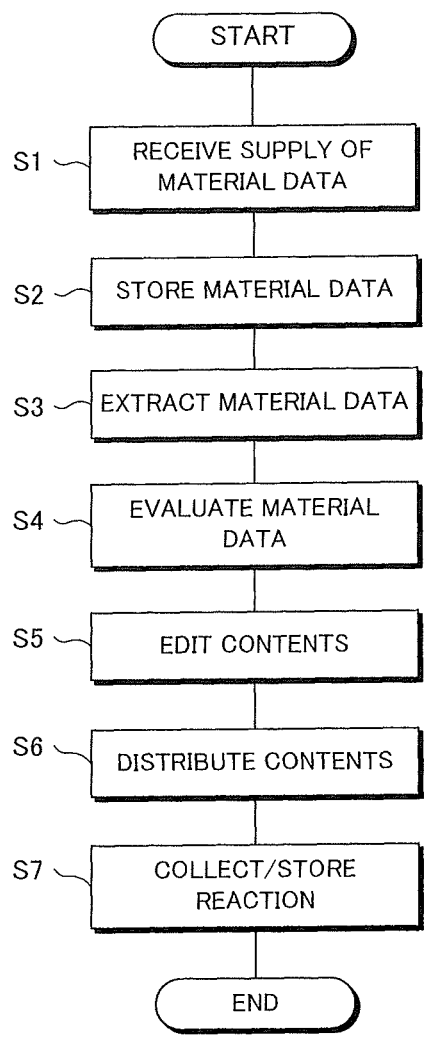
FIG. 4 is a flowchart showing the operation of a contents creating device according to the first embodiment.

Next, the operation of the contents creating device 100 configured as described above is explained. FIG. 4 is a flowchart showing the operation of the contents creating device 100. First, the contents creating device 100 receives material data supplied from the user terminal 200 (step S1). Next, the contents creating device 100 stores the material data in the material database 120 (step S2). Then, the contents creating device 100 extracts material data suitable for the conditions (step S3) and evaluates the relativity of the material data of the contents to a user as contents distribution destination (step S4).

Next, the contents creating device 100 creates an article based on the material data, determines the arrangement of the article according to the evaluation of relativity described above, and edits contents (step S5). Then, the contents creating device 100 distributes the contents edited for each distribution destination in this manner to each user within the predetermined group (step S6). When there is a reaction from a user who browses, comments, etc., the distributed contents, the contents creating device 100 collects the reaction, stores it in the database along with the history data (step S7), and exits the processing. By the obtained reaction, the basis for evaluation described above is updated and reflected in the subsequent distribution. In this manner, it is possible for the contents creating device 100 to distribute contents having an article arrangement with high relativity to the distribution destination user.

Material Data Extraction Process

Figure 5:
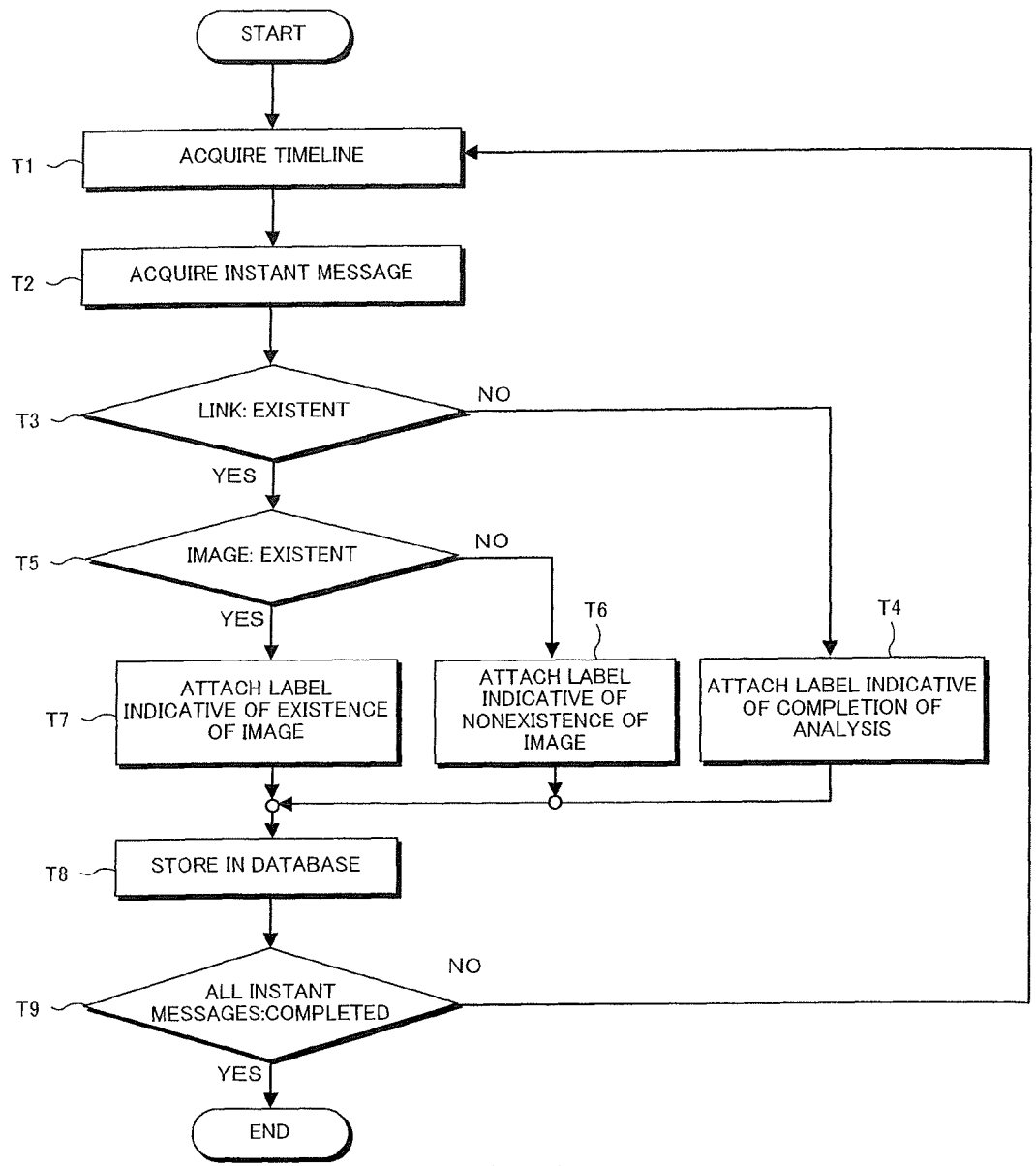
FIG. 5 is a flowchart showing an example of material data extraction process according to the first embodiment.

FIG. 5 is a flowchart showing an example of material data extraction process. As shown in FIG. 5, first, a timeline (data put in order chronologically) of an instant message is acquired (step T1). Then, each instant message is acquired from the timeline (step T2).

Next, whether or not there is data indicative of a link in the acquired instant message is determined (step T3). When there is no data indicative of a link, a label indicating that analysis is completed is attached to the instant message (step T4) and the process proceeds to step T8. When there is data indicative of a link, whether or not there is image data at the link destination is determined (step T5). When there is no image data, a label indicating that there is no image is attached to the instant message (step T6) and the process proceeds to step T8. When there is image data, a label indicating that there is an image is attached to the instant message. Then, the instant message is stored in the material database (step T8). Finally, whether the determination described above is completed for all the instant messages of the acquired timeline is determined (step T9). When not completed, the process returns to step T1 and when completed, the processing is exited.

Use of Data

FIGS. 6(*a*) to 6(*c*) are tables showing a correspondence relationship of each piece of data. When material data is supplied by a user a, the contents creating device 100 distributes information to other users belonging to a group G1 using the table as shown in the example in FIG. 6(*a*).

It is also possible to store a subjective index, such as a community score and category score, for each user as distribution destination using the table as shown in the example in FIG. 6(*b*). At the time of summation of scores, it is possible to sum an objective index, such as an image score and sentence score, and a subjective index, such as a category score and community score, as scores for each user by using the table as shown in the example in FIG. 6(*c*) for each user as distribution destination. Then, it is possible to distribute contents in which articles are arranged according to the magnitude of the score to the same group. The contents distribution destination may be a group to which the user as a supply source does not belong or a user belonging to the group.

Article Arrangement

Figure 7:
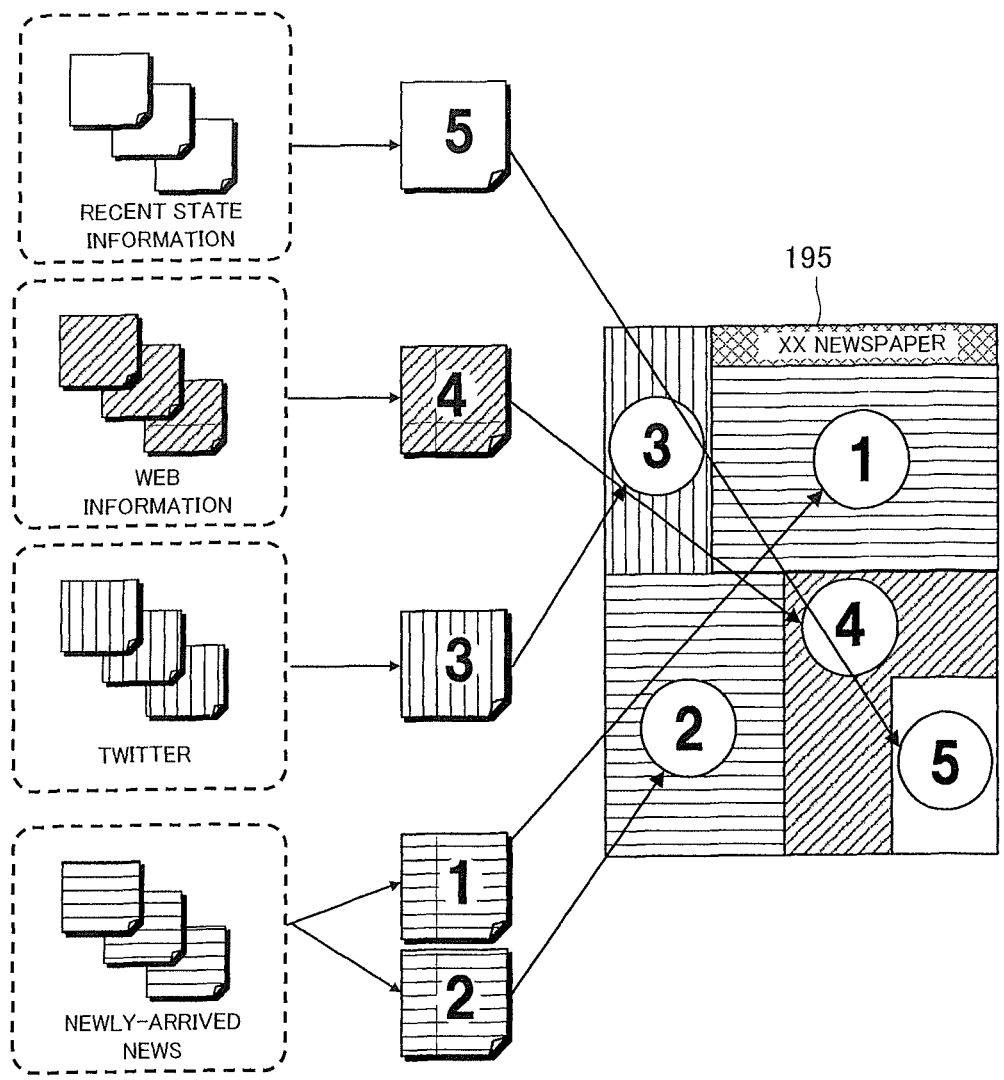
FIG. 7 is an outline diagram showing an example of an arrangement of articles.

FIG. 7 is an outline diagram showing an example of an article arrangement. As shown in FIG. 7, the contents creating device 100 classifies each piece of material data into categories for management. For example, it is possible to manage material data according to categories, such as "Recent state information", "WEB information", "Twitter", and "Newly-arrived news". Then, it is possible to rank the articles in each category according to the degree of importance. When evaluation is made by only the category, if it is assumed that a user as distribution destination has a basis in which the first place is "Newly-arrived news", the second place is "Twitter", the third place is "WEB information", and the fourth place is "Recent state information", the degree of importance is determined according to this order as shown in FIG. 7. On the other hand, when the display of the contents is in the form of newspaper or magazine, the ranking of arrangement is made in advance in a crosswise manner. It is possible to arrange articles (material data) according to the ranking of arrangement.

Figure 8:
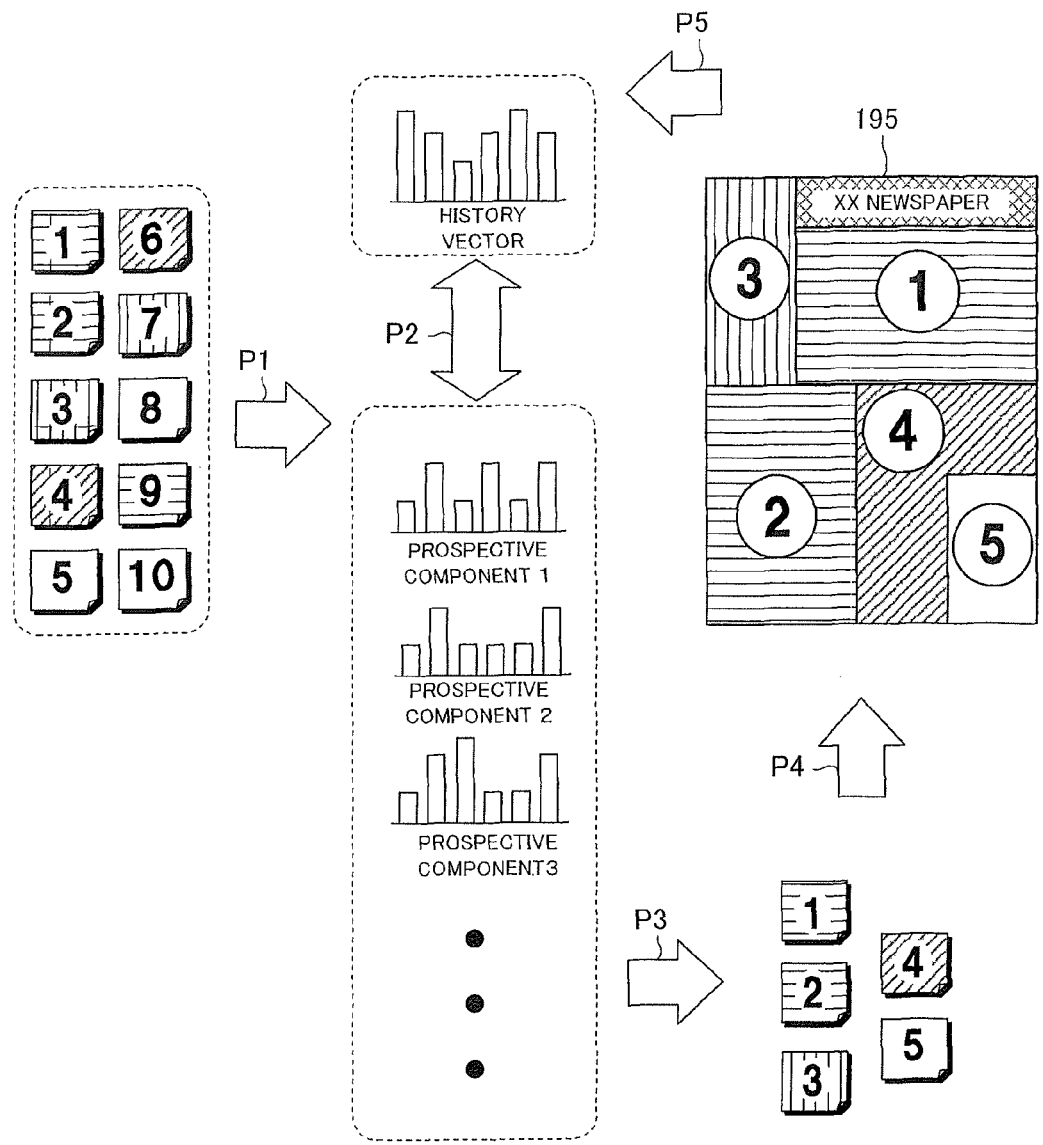
FIG. 8 is an outline diagram showing an example of an arrangement of articles.

In the example described above, the degree of importance of each piece of material is evaluated, however, it may also be possible to compoundly evaluate material data from which articles are created. FIG. 8 is an outline diagram showing an example of an arrangement of articles when evaluation compoundly is made. First, the vector of degree of importance is evaluated for each prospective component using a plurality of pieces of material data (step P1). Then, the history vector unique to a user as distribution destination is compared with each prospective component (step P2) and the most suitable prospective component(s) is selected (step P3). The most suitable prospective components selected by comparison are displayed in the form of newspaper based on their degrees of importance (step P4). Further, the history vectors of the user are updated according to the contents displayed in the form of newspaper (step P5). The updated history vectors are used in the next comparison of vectors of degree of importance.

Display Example of User Terminal

Figure 9:
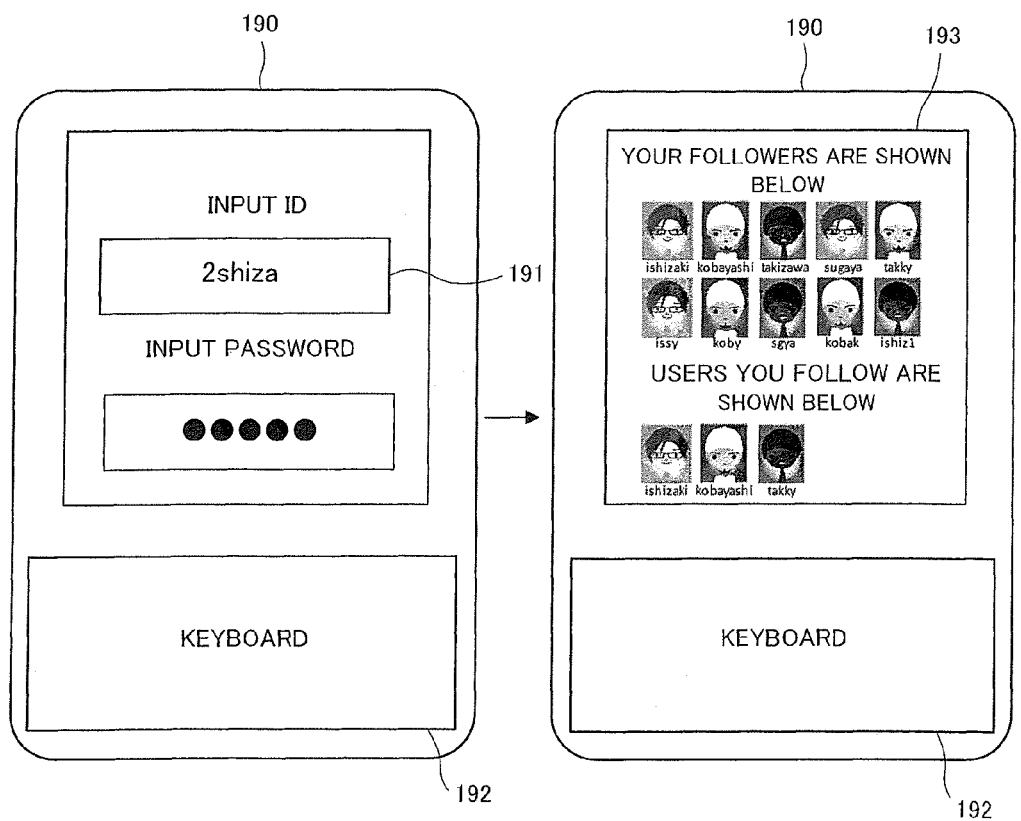
FIG. 9 is a diagram showing an example of a GUI image displayed on a user terminal.

FIG. 9 is a diagram showing an example of a GUI image displayed on a user terminal. The user terminal 200 has a user information input unit, such as a touch panel, and by the GUI on a screen 190, an input screen 191 and a keyboard 192 are displayed and the input of the account/password is received from the user. As the account/password, those for an instant message exchange system represented by, for example, Twitter (registered trademark), can be used. Then, based on the input account of the user, the user account names of the followers and the destinations to follow of the user (community of an instant message exchange system) and account images are acquired as shown in a list display 193 in the figure and they are stored in the user database.

Figure 10:
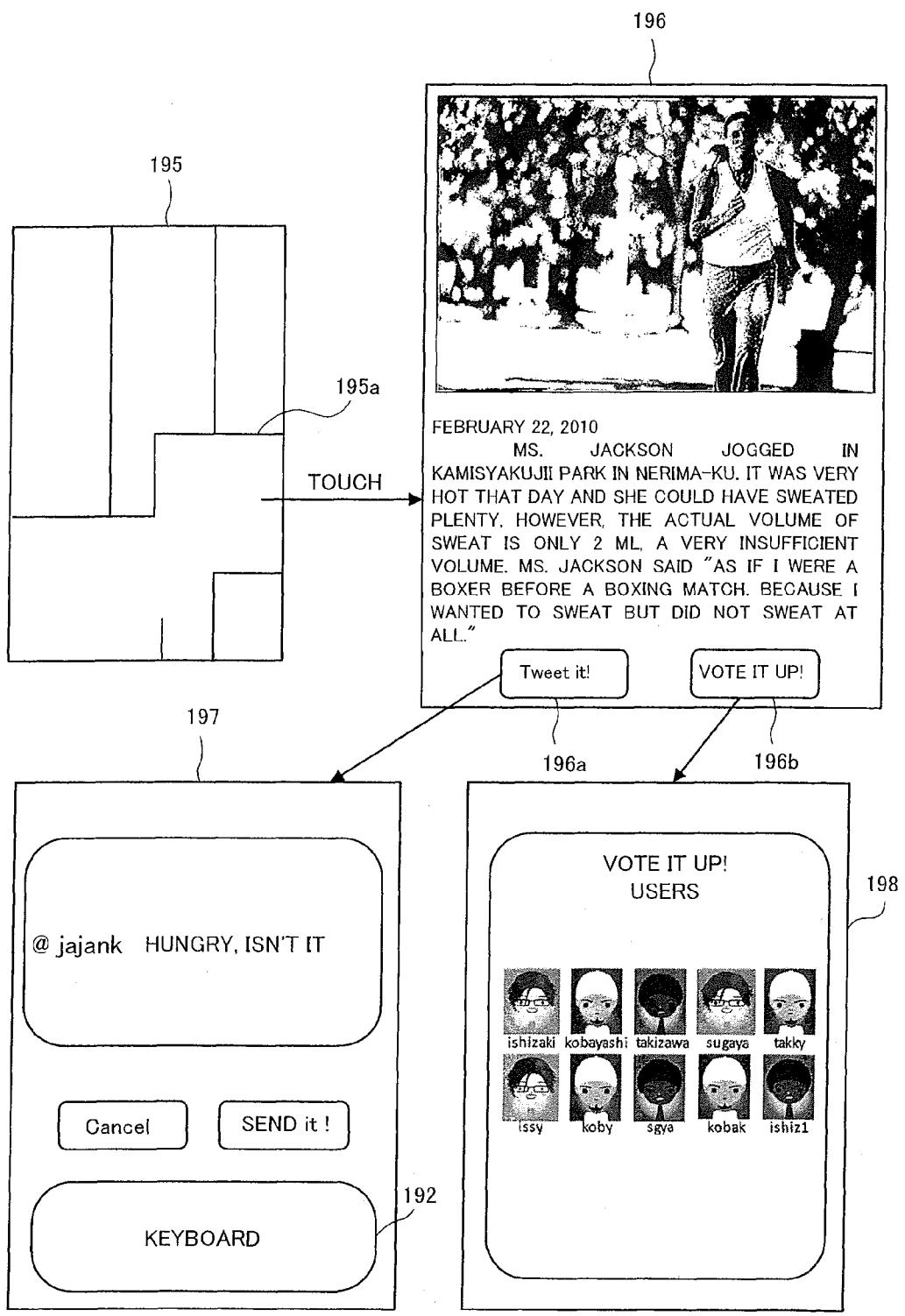
FIG. 10 is a diagram showing an example of a GUI image displayed on a user terminal.

FIG. 10 is a diagram showing an example of a GUI image displayed on a user terminal. When an article 195*a* is touched on a contents display 195, an enlarged version 196 of the article is displayed. On the GUI, it is made possible to collect reactions of users by attaching a contribution button 196*a* to an instant message exchange system and an "VOTE IT UP!" button 196*b* for each article. When the contribution button 196*a* is pressed down, a screen 197 is displayed and it is possible to input a reaction with the keyboard 192. When the "VOTE IT UP!" button 196a is pressed, a list of users who have judged the article to be "VOTE IT UP!" is displayed. Further, it may also be possible to include a function to automatically update the article when there is an update on the article or to enable a user to select an article that the user desires to save in a scrap book by displaying a "Save" button. It may also be possible to cause the reaction management unit 160 to receive the specification of an article desired to be saved and to reflect it at the time of creation of the next contents.

Second Embodiment

In the embodiment described above, material data is collected using a log of an instant message exchange system, however, it may also be possible to create contents by making an interview with a user as a supply source based on the reactions to the material data uploaded by the user as a supply source so that the material data can be browsed within a predetermined group.

Figure 11:
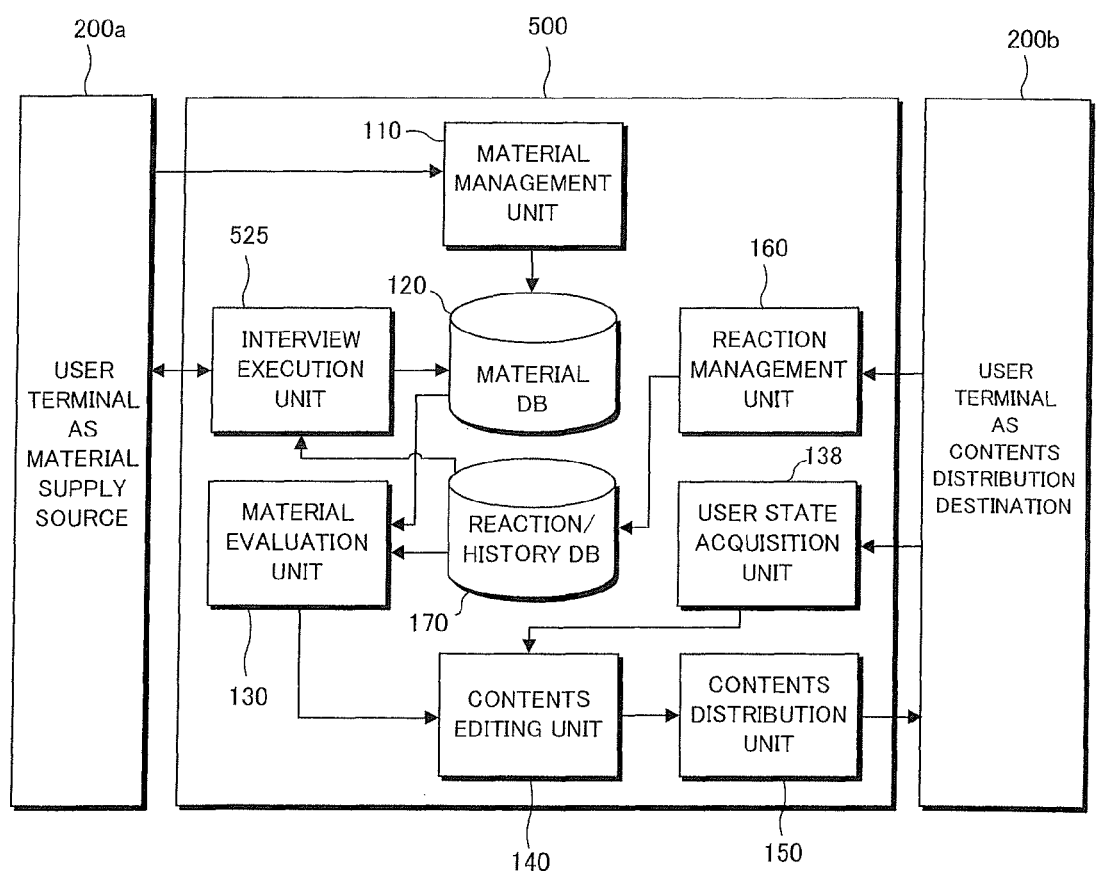
FIG. 11 is a block diagram showing a configuration example of a contents distribution system according to a second embodiment.

FIG. 11 is a block diagram showing a configuration example of a contents distribution system. The contents distribution system shown in FIG. 11 includes the user terminal 200a of a material supply source, a contents creating device 500, and the user terminal 200b of a user as contents distribution destination. The contents creating device 500 has substantially the same configuration as that of the contents creating device 100 in the first embodiment and further includes an interview execution unit 525.

The interview execution unit 525 accesses the reaction/history database 170 and when there is a reaction to the material data, it notifies the user terminal 200a of the supply source of the material data of the reaction and receives a reply from the user terminal 200a of the supply source in text data. The received reply is included in the material data and contents are created by making use of the material data. Due to this, it is possible to create an article from the material data and to easily create contents suitable for each user.

When there is a reaction (request or question) from a user within a predetermined group to material data, it is possible to make an interview with the user a who has supplied material data using a table by recording the reaction for each piece of the material data.

Figure 12:
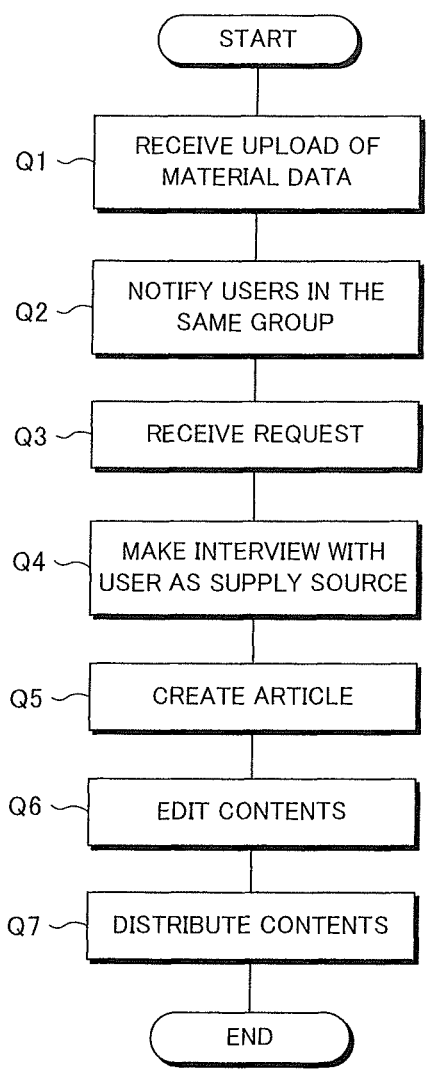
FIG. 12 is a flowchart showing the operation of a contents creating device according to the second embodiment.

FIG. 12 is a flowchart showing the operation of the contents creating device 500. As shown in FIG. 12, first, the contents creating device 500 receives the upload of material data from a user as supply source (step Q1). Then, the contents creating device 500 notifies users belonging to the same group as that to which the user as supply source belongs of the upload of material data (step Q2). Next, the contents creating device 500 receives a reaction (request or question) to the uploaded material data from a user (step Q3). A request is, for example, one to request an explanation of the material data.

Next, the contents creating device 500 makes an interview with the user as supply source based on the reaction (step Q4). Then, an article is created by also making use of a reply of the user as supply source obtained by the interview as material data of the article (step Q5). Then, obtained articles are arranged by an appropriate method and contents are edited (step Q6). Finally, the contents obtained by the editing are distributed to the users in the same group (step Q7).

What is claimed is:

1. A computer-implemented contents selection system including a server in data communication with user terminals through a network to create content data to be distributed within a group, the group including at least a first user and a plurality of other third party users, the content to be distributed to the first user based upon interests determined from the third party user, the server comprising:
   physical processor;
   memory storing instruction executable by the processor to perform content selection;
   a material management unit in data communication with at least one of said user terminals, the material management unit including a user database and a material extraction unit, wherein:
   the user database includes third party user account information data and group user operation data corresponding to actions of one or more users within the group;
   the material extraction unit includes a module extracting user data and material content data from associated third party user operation data;
   a material database in data communication with the material management unit receiving and storing said material content data;
   a material evaluation unit in data communication with the material database, the material evaluation unit configured to evaluate relativity of the material data to the first user, and assigning a relativity ranking of items of the material data for the first user, the relativity ranking determined based on user interest indicating data including information corresponding to content data based upon interests or operates of the third party user, wherein:
   the material evaluation unit comprehensively evaluates the relativity using a basis for evaluation held by each user as the contents distribution destination, updated according to browsing of an article, and used for evaluation of relativity each time, a relationship between a user as the contents distribution destination and a user as a supply source of the material data as a basis for evaluation, and a relationship between a category to which the material data belongs and a user as the contents distribution destination as a basis for evaluation; and
   a contents editing unit in data communication with the material evaluation unit, the contents editing unit configured to determine an article arrangement of a plurality of output content articles for the first user in accordance with evaluation data received from the material evaluation article unit, wherein:
   the contents editing unit evaluates the total relativity as a vector by weighting the relativities, respectively, to extract the material data;
   a reaction management unit configured to receive a reaction to the material data from a user within the predetermined group;
   an interview execution unit configured to notify the reaction to a user as a supply source of the material data and receive a reply from the user as the supply source, wherein contents are created by making use of the material data including the reply; and
   wherein contents constituted by the contents article displayed at least one user terminal corresponding to the first user by transmitting corresponding data from the server to the at least one user terminal via the network.

2. The contents selection system according to claim 1, wherein
   the material evaluation unit makes use of a basis for evaluation held by each user as the contents distribution destination and updated according to browsing of an article to evaluate relativity each time.

3. The contents selection system according to claim 1, wherein
the material evaluation unit evaluates the relativity using a relationship between a user as the contents distribution destination and a user as a supply source of the material data as a basis for evaluation.

4. The contents selection system according to claim 1, wherein
the material evaluation unit evaluates the relativity using a relationship between a category to which the material data belongs and a user as the contents distribution destination as a basis for evaluation.

5. The contents selection system according to claim 1, wherein
the contents editing unit evaluates the total relativity as a vector by weighting the relativities, respectively, to extract the material data.

6. The contents selection system according to claim 1, wherein
the contents editing unit evaluates the relativity by weighting it according to the state of a user of the distribution destination to extract the material data.

7. The contents selection system according to claim 1, wherein
the contents editing unit evaluates the relativity by weighting it according to the state of a user of the distribution destination to extract the material data.

8. The contents selection system according to claim 1, wherein
the material evaluation unit evaluates the relativity using a relationship between a feature amount of the material data and a user as the contents distribution destination as a basis for evaluation.

9. The contents selection system according to claim 8, wherein
the contents editing unit evaluates the total relativity as a vector by weighting the relativities, respectively, to extract the material data.

10. The contents selection system according to claim 8, wherein
the contents editing unit evaluates the relativity by weighting it according to the state of a user of the distribution destination to extract the material data.

11. The contents selection system according to claim 1, wherein
the reaction management unit receives a specification of an article within the created contents by the user of the distribution destination, and
contents for the user of the distribution destination are created newly using the specified article received by the reaction management unit.

12. The contents selection system according to claim 1, wherein
the contents editing unit, when material data is added at an update, evaluates relativity of the material data to a user as contents distribution destination and dynamically determines the arrangement of the contents article according to the evaluation;
wherein the contents are created so that the contents article is displayed at the contents distribution destination by the determined arrangement.

13. The contents selection system according to claim 1 wherein the third party associated user data comprises information updates provided by said third party users.

14. A computer-implemented contents creating method of a contents creating system, the system including a server in data communication with user terminals through a network, the method to create content data to be distributed within a predetermined group of user terminals, the method comprising the steps of:
evaluating relativity material data indicating user community information, wherein:
the user community information includes usage information from third parties other than a specific user, wherein at least one of the specific users has associated third parties, each respective specific users and their associated third parties comprising the respective community associated each respective user,
the evaluating relative material data comprehensively evaluates the relativity using a basis for evaluation held by each user as the contents distribution destination, updated according to browsing of an article, and used for evaluation of relativity each time, a relationship between a user as the contents distribution destination and a user as a supply source of the material data as a basis for evaluation, and a relationship between a category to which the material data belongs and a user as the contents distribution destination as a basis for evaluation;
the material data supplied from at least one of said user terminals via the network, by at least one specific user having an associated personal account of a user; and
editing content for distribution by determine an article arrangement of a plurality of output content articles for the user in accordance with evaluated material data wherein:
editing content evaluates the total relativity as a vector by weighting the relativities, respectively, to extract the material data;
receiving a reaction to the material data from a user within the predetermined group;
notifying the reaction to a user as a supply source of the material data and receive a reply from the user as the supply source, wherein contents are created by making use of the material data including the reply; and
distributing contents data including contents article data so that a contents article is displayed at a user terminal based upon the community information.

15. A computer-implemented content selection and delivery system including a server in data communication via a communication network, with a plurality of user terminals, the server comprising:
physical processor;
memory storing instruction executable by the processor to perform content selection;
a material management unit in data communication with at least one of said user terminals, the material management unit including a user database and a material extraction unit, wherein:
the user database stores community account information data, including a first community account information data, the first community account information data including information from a first sub-community, the first sub-community including a first user, and a plurality of third party users each being designated as associated with the first user;
the material extraction unit configured to extract the first community account information user data corresponding to the first user, and sub-community material content data from the plurality of third party users in the first sub-community;
a material database in data communication with the material management unit receiving and storing said sub-community material content data;

a material evaluation unit in data communication with the material database, the material evaluation unit configured to evaluate relativity of the sub-community material content data to particular users, and assigning a relativity ranking of items of the sub-community material content data for particular users, the relativity ranking determined based on user community information corresponding to associated user information data, and outputting evaluation data, wherein:

the material evaluation unit is configured to evaluate relativity of the sub-community material content data to the first user and assigning a first relativity ranking of items of the sub-community material content data for the first user in generating the evaluation data; wherein:

the material evaluation unit comprehensively evaluates the relativity using a basis for evaluation held by each user as the contents distribution destination, updated according to browsing of an article, and used for evaluation of relativity each time, a relationship between a user as the contents distribution destination and a user as a supply source of the material data as a basis for evaluation, and a relationship between a category to which the material data belongs and a user as the contents distribution destination as a basis for evaluation; and a content editing unit in data communication with the material evaluation unit, the content editing unit configured to determine an output article arrangement of a plurality of output content articles in accordance with the evaluation data received from the material evaluation unit, wherein:

the contents editing unit evaluates the total relativity as a vector by weighting the relativities, respectively, to extract the material data;

a reaction management unit configured to receive a reaction to the material data from a user within the predetermined group;

an interview execution unit configured to notify the reaction to a user as a supply source of the material data and receive a reply from the user as the supply source, wherein contents are created by making use of the material data including the reply; and wherein content constituted by the content articles displayed at least one user terminal by transmitting corresponding data from the server to the at least one user terminal via the network.

16. The content selection and delivery system according to claim 15 wherein:

the user database stores second community account information data, the second community account information data including information from a second plurality of third party users, each being designated as associated with a second user; and the material extraction unit being configured to extract the second community account information user data corresponding to the second user, and second sub-community material content data from the plurality of third party users designated as in a sub-community associated with the second user.

* * * * *